United States Patent
Heinzeroth (12) 
(10) Patent No.: US 6,516,750 B1
(45) Date of Patent: Feb. 11, 2003

(54) MODULAR BIRDHOUSE

(76) Inventor: Jerry E. Heinzeroth, 3012 Carefree Dr., Rockford, IL (US) 61114

( * ) Notice: Subject to any disclaimer, the term of this patent is extended or adjusted under 35 U.S.C. 154(b) by 0 days.

(21) Appl. No.: 10/053,149

(22) Filed: Jan. 18, 2002

(51) Int. Cl.$^7$ .............................................. A01K 31/00
(52) U.S. Cl. ...................... 119/428; 119/429; 119/468; 119/469; 119/432
(58) Field of Search .................... 119/428, 429, 119/459, 463, 467, 468, 469, 432, 431; D30/110

(56) References Cited

U.S. PATENT DOCUMENTS

| | | | |
|---|---|---|---|
| D140,175 S | 1/1945 | Hyde | D31/2 |
| 2,944,515 A | * 7/1960 | Anklam | 119/434 |
| 2,951,312 A | * 9/1960 | Engh | 119/431 |
| 3,563,205 A | 2/1971 | Vail | 119/23 |
| 3,696,792 A | 10/1972 | Bruhns | 119/23 |
| 3,804,066 A | * 4/1974 | Lowe | 119/431 |
| 3,818,868 A | * 6/1974 | Boehland, Jr. | 119/431 |
| 4,702,198 A | 10/1987 | Holyoak | 119/23 |
| 4,767,088 A | * 8/1988 | Fielder et al. | 119/57.9 |
| 5,195,460 A | * 3/1993 | Loken | 119/52.3 |
| 5,228,410 A | 7/1993 | Parker | 119/26 |
| 5,490,480 A | 2/1996 | Dumond | 119/57.9 |
| 5,560,314 A | * 10/1996 | Wessinger | 119/428 |
| 5,740,762 A | 4/1998 | Bennett | 119/428 |
| 5,943,981 A | 8/1999 | Chrisco | 119/428 |
| 6,009,837 A | 1/2000 | McClasky | 119/428 |
| 6,394,030 B1 | * 5/2002 | Geiger et al. | 119/57.8 |

* cited by examiner

Primary Examiner—Yvonne R. Abbott
(74) Attorney, Agent, or Firm—Kenneth J. Hovet; Arthur K. Samora (57) ABSTRACT

A modular birdhouse in accordance with the present invention includes a support pole, a collar, at least one wire form and at least one nest module. First, the collar is slidably connected to the pole. The wire form has a square shape, and the ends of the wire form are upturned and inserted into corresponding openings in the collar. The collar includes coordinated flanges with fasteners that fix the wire forms to the collar. Two or more collars can be interconnected in a stacked manner to create tiers of nest modules. Each nest module has a plurality of connector slots. For attachment, the nest module is positioned within the square shape of the wire form and then rotated until the connector slots of the nest module engage the wire form. A porch structure interconnects the wire form to the nest module to prevent further rotation and disengagement of the nest module. Nest modules may be added or removed from the wire forms as desired by the operator and without the use of tools and/or implements.

27 Claims, 11 Drawing Sheets

MODULAR BIRDHOUSE

FIELD OF THE INVENTION

The present invention pertains generally to wildlife shelters. More particularly, the present invention pertains to birdhouses having a plurality of modular units which can each be quickly and conveniently serviced, added and/or deleted as desired by the operator without disturbing the other modular units.

BACKGROUND OF THE INVENTION

It is well-known that people place birdhouses in their backyards for providing a nesting area for birds. As the birds arrive and nest in the birdhouses, they are observed by the birdhouse owner. This provides a sense of well-being and enjoyment for the owner, as well as a much-needed habitat for the birds.

Because birds tend to migrate and travel in flocks, the number of birds that may be nesting in a given area will vary, often dramatically so. To accommodate variations in the number of birds currently nesting, it is important to provide a modular birdhouse with separate and discrete units. Optimally, the birdhouse would allow the owner to quickly and conveniently service, add and/or subtract units as desired, according to the demand caused by the number of birds currently attempting to nest in the birdhouse and surrounding areas.

U.S. Pat. No. 5,740,762, which issued to Bennett for an invention entitled "Modular Shelter Assembly for Birds", discloses a bird shelter wherein a collar is fixed to a support pole. Multiple tiers of individual pie-shaped compartments are fixed to the collar with mounting hooks so that the compartments extend outwardly from the support pole. For each tier, a common roof is fixed to the support pole with a roof collar so that it covers all of the compartments. However, since the common roof covers all the compartments in the device disclosed by Bennett, one cannot add or remove compartments without essentially disassembling the entire unit by removing the roof collar, removing the roof and then adding/subtracting compartments. Doing so will also most likely disturb any birds that are already nesting in adjacent compartments.

U.S. Pat. No. 6,009,837, which issued to McClasky for an invention entitled, "Purple Martin Bird House And Telescoping Pole", discloses a birdhouse assembly with an underlying floor which is secured to a support collar. The floor terminates at a pair of opposing flanges, and nesting areas are created by sliding panels between the flanges and the panels are fixed in place by peg and slot mechanisms. The entire arrangement is overlaid with a roof that covers all the nesting areas and is attached to some of the panels with fasteners.

The device as disclosed by McClasky provides the same limitations as the device disclosed by Bennett, whereby the roof is permanently fastened to the panels. As such, adding/subtracting panels once the birdhouse is assembled is not possible.

In view of the above, it is an object of the present invention to provide a modular birdhouse having a plurality of separate and discrete nesting modules for birds. It is another object of the present invention to provide a modular birdhouse wherein each nest module has its own porch, predator guard and roof. It is another object of the present invention to provide a modular birdhouse wherein housing units or nest modules can be serviced, removed and/or added as necessary without disturbing any of the other units that are already assembled and/or occupied by birds. Yet another object of the present invention is to provide a modular birdhouse with nest modules that can be removed and/or added without the use of tools or implements. It is a further object of the present invention to provide a modular birdhouse which is easy to use, clean and maintain while also being economical to manufacture.

SUMMARY OF THE INVENTION

A modular birdhouse in accordance with the present invention includes an upstanding support pole, a collar and a plurality of nest modules. The support pole is placed in the ground or other suitable foundation structure and the collar is releasably fixed at various vertical positions as selected by the operator. The nest modules are then attached in a unique manner to the collar so that the nest modules extend radially outward from the support pole.

For the present invention, each nest module also includes a enclosure having four walls, an open top and an open bottom. The corners of the enclosure each include a enclosure notch proximate the bottom edge of the enclosure, and one of the walls is formed with a bird entrance opening to allow for bird ingress and egress. The size and shape of the opening can be varied or it can be entirely closed with removable entrance opening inserts. The lower module floor and the upper module ceiling have the same structure to facilitate the use and manufacture of the present invention and corner notches are formed both in the module floor and module ceiling.

For assembly, both the module floor and the house ceiling are attached to the enclosure to enclose the open top and the open bottom as defined by the walls. This aligns the enclosure notches with the notches in the module floor. Notches in the enclosure and the module floor combine co-extensively to establish a connector slot in each respective corner of the assembled nest module.

The modular birdhouse of the present invention also includes a plurality of wire forms to connect each corresponding nest module to the collar. The wire form is made of a flexible wire which is bent into a polygonal form that defines an inner area having a center axis. Each form preferably includes four form sides and four form corners. The ends of the wires are bent so that the ends are about parallel to each other and about perpendicular to the plane of the wire form. For attachment, the bent ends are inserted into corresponding openings on the underside of the collar. When the wire-form is attached to the collar, it will extend radially outward from the pole.

Once the nest module is assembled and the wire form is fixed to the collar, the nest module is attached to the wire form. This is accomplished by engaging each corner notch in the nest module with a respective form side of the wire form. This engagement will allow the wire form to support the nest module. A roof is placed over each module ceiling so that a plurality of nest modules are created which are completely self-contained units.

The modular birdhouse of the present invention further includes a predator guard which has an arcuate wall and a brace that merge into an arched perch bar. The predator guard is attached to the module floor so that it extends upward from the module floor between the access opening and a nesting cavity in the module floor. This arrangement prevents certain types of predators from entering the nest module through the access opening of the enclosure.

The nest module further includes a porch which is attached to one corner of the wire form. In particular, the porch is attached to a wire form corner furthest from the support pole. Once attached, the porch abuts the enclosure of the nest module and fixes the nest module in place preventing slippage or movement of the nest module once the connector slots are engaged with the form sides. Alternatively, the form corner furthest from the pole could be bent upwards. This provides an additional predator guard external to the enclosure, as well as an external perch area for any birds that might choose the birdhouse for a nesting area. In this alternative, the corner is bent upwards to establish a porch corner with the porch corner lying in a plane that is about perpendicular to the plane coincident with the wire form.

BRIEF DESCRIPTION OF THE DRAWINGS

The novel features of this invention, as well as the invention itself, will be best understood from the accompanying drawings, taken in conjunction with the accompanying description in which similar referenced characters refer to similar parts and in which.

WRITTEN DESCRIPTION OF THE PREFERRED EMBODIMENT

Referring now to the Figures, the modular birdhouse assembly of the present invention is shown and is generally designated by reference character 10. In brief overview, the assembly comprises an upstanding vertical support pole 12, at least one collar 14 and a plurality of nest modules 16 that are attached to a collar 14 with a wire form 18 in a manner hereinafter described. Once attached, the nest modules extend radially outward from the pole. In a basic form, one or more collars can be maintained at selected vertical positions on the support pole by the use of set screws, cross pins, wedges, cams, jacks, detents and pegs known in the art. Alternatively, the half-sleeves of each collar could be tightly drawn together against the pole to create an effective frictional engagement. Preferably, the collars will be slidably attached to the pole and winches or other known hoisting means may be used to vertically move and secure the collars at selected locations on the pole.

Additionally, a plurality of collars can be interconnected to provide tiered sets of the modular birdhouse. This arrangement allows all of the sets to be raised and lowered on the pole as one integrated assembly. To join two or more tiers of modular birdhouses to each other, an upper flange of one collar is attached to a lower flange of a vertically adjacent collar in a manner to be hereinafter described.

Figure 1:
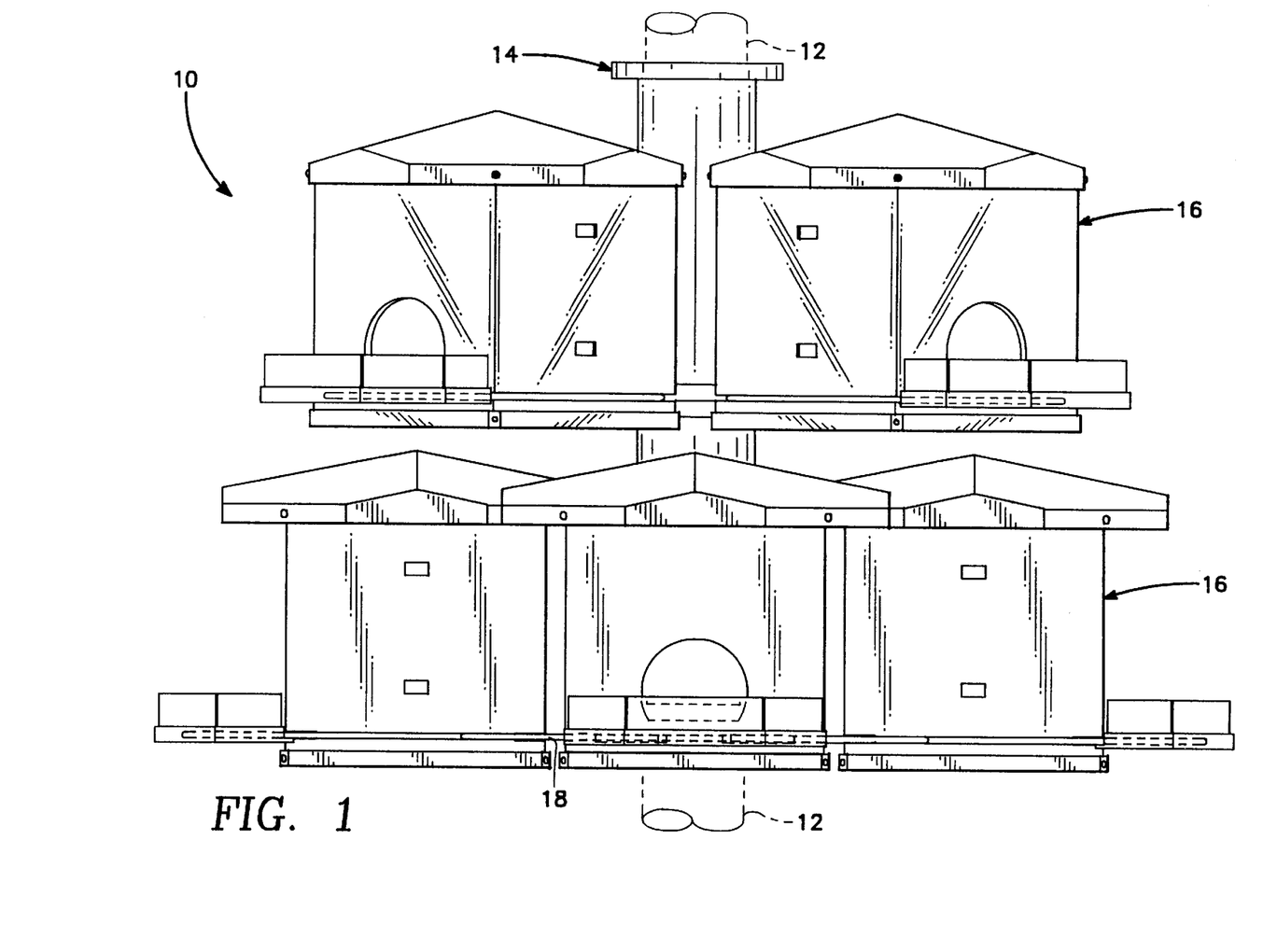
FIG. 1 is a side elevational view of first and second tiers of the modular birdhouse of the present invention which are angularly and vertically offset from each other about a support pole.

The collar(s) can also be rotated horizontally about the support pole longitudinal axis to locate the tiered sets of nest modules at selected, angularly offset positions. The above orientations are depicted in FIG. 1 with two tiers of birdhouse assemblies. Preferably, each tier is rotated about forty-five degrees (45°) out of phase with the tier above and/or below it to minimize the vertical height of the overall tiered assembly. The collars should have sufficient longitudinal extent so that when they are interconnected in a stacked manner, the bottom of one tier will not interfere with the roof of a lower tier.

Figure 2:
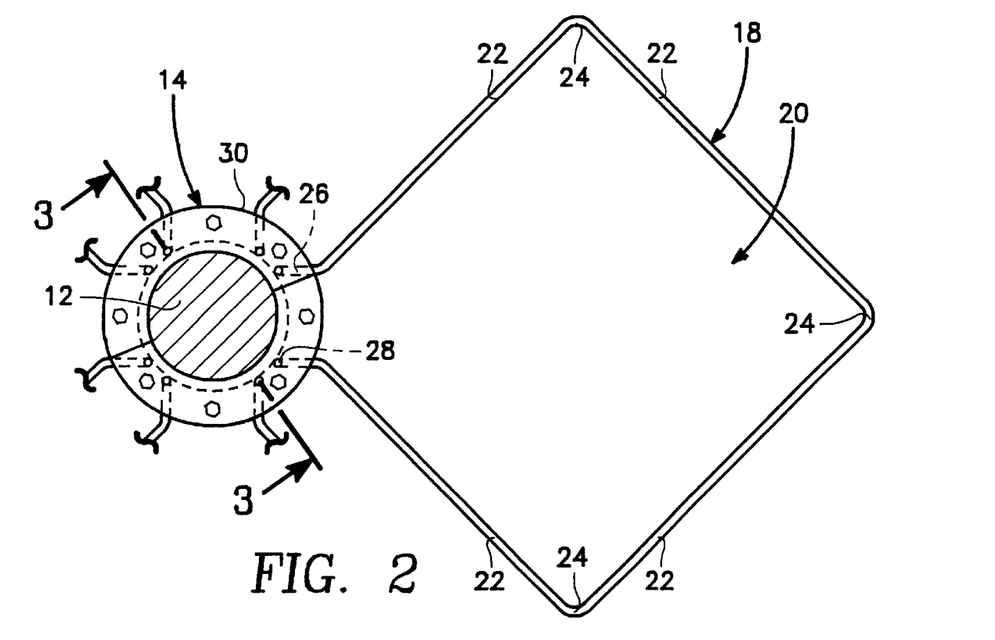
FIG. 2 is a top plan view of a single wire form used to support an individual nest module that comprises part of the birdhouse shown in FIG. 1, with the wire form attached to a collar connected to the support pole.
Figure 3:
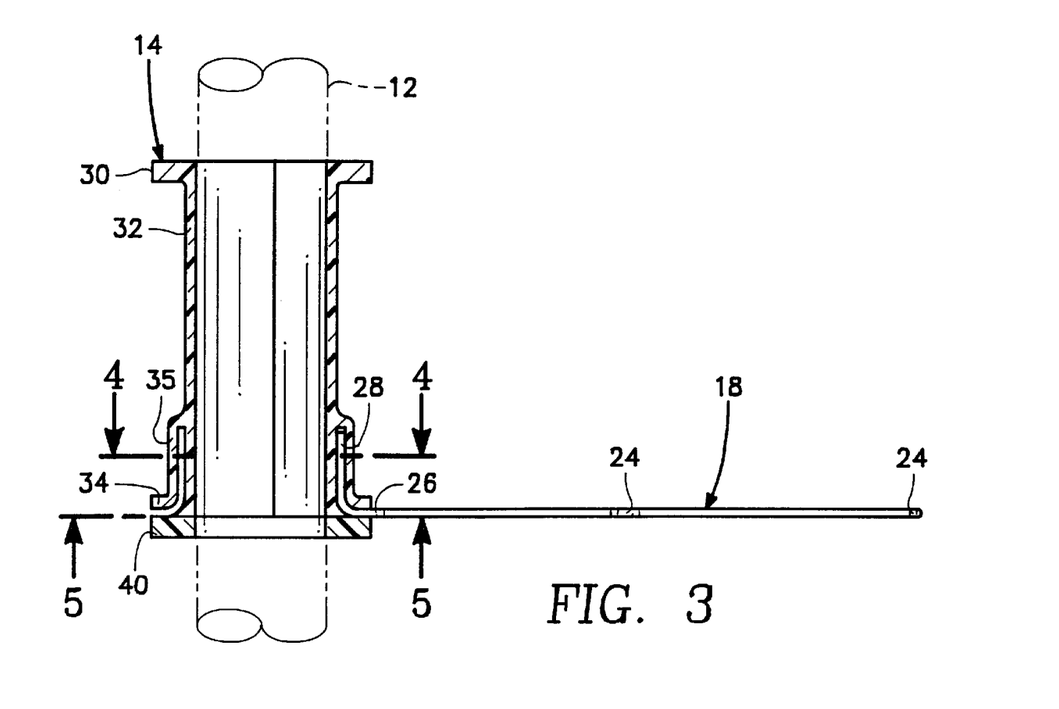
FIG. 3 is a view taken along line 3—3 in FIG. 2.
Figure 4:
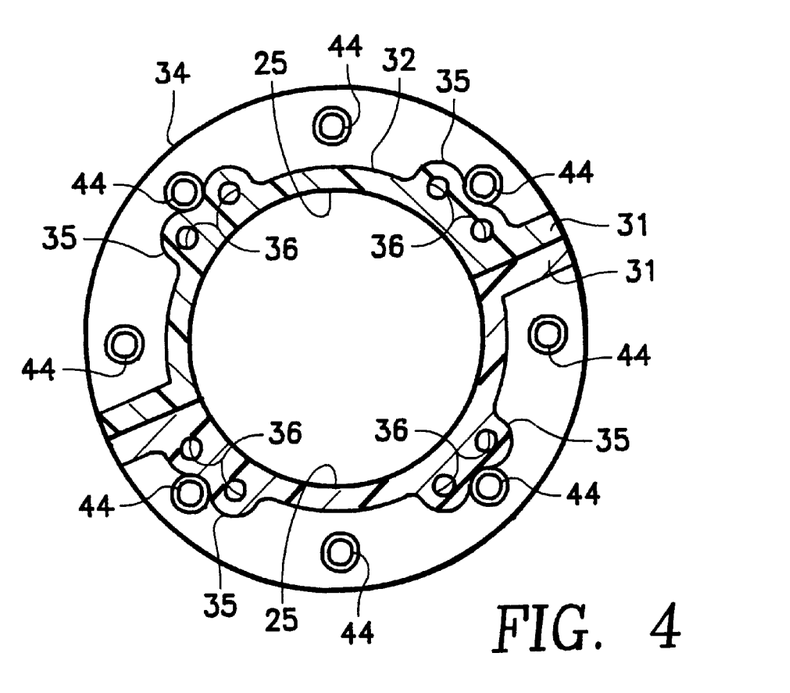
FIG. 4 is a view taken along line 4—4 in FIG. 3.
Figure 7:
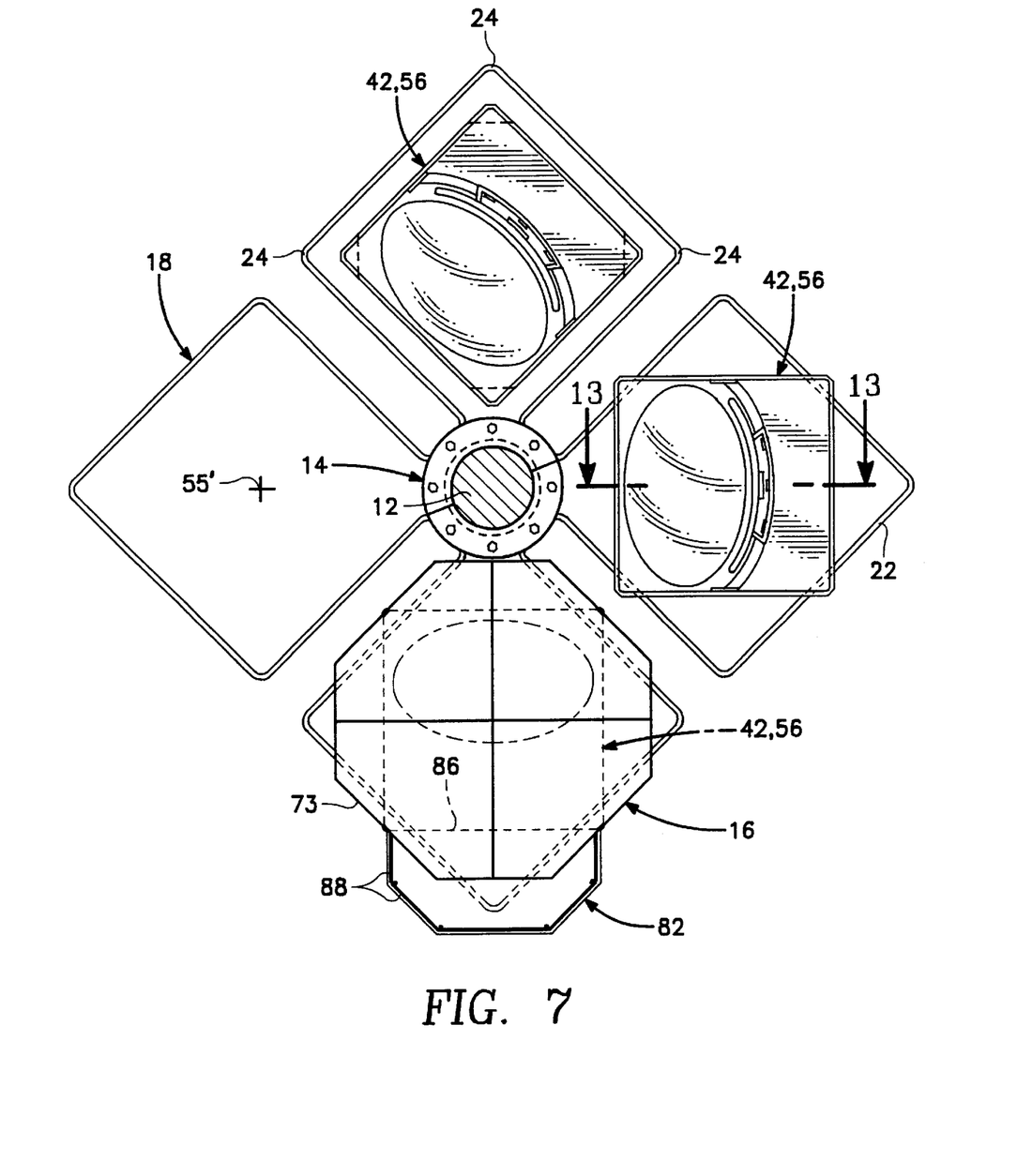
FIG. 7 is a top plan view of the lower tier birdhouse of FIG. 1, with nest modules in different stages of assembly and with portions removed to more clearly show the manner in which the module floor and porch cooperate with the wire form structure.
Figure 8:
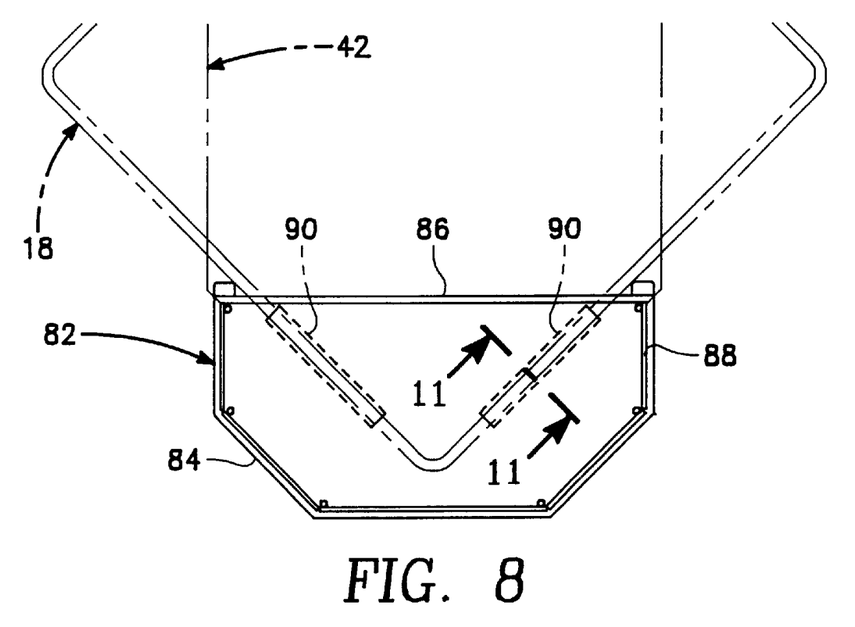
FIG. 8 is an enlarged fragmentary to plan view of the porch structure for the forwardmost fully assembled nest module and wire form shown in FIG. 7.
Figure 9:
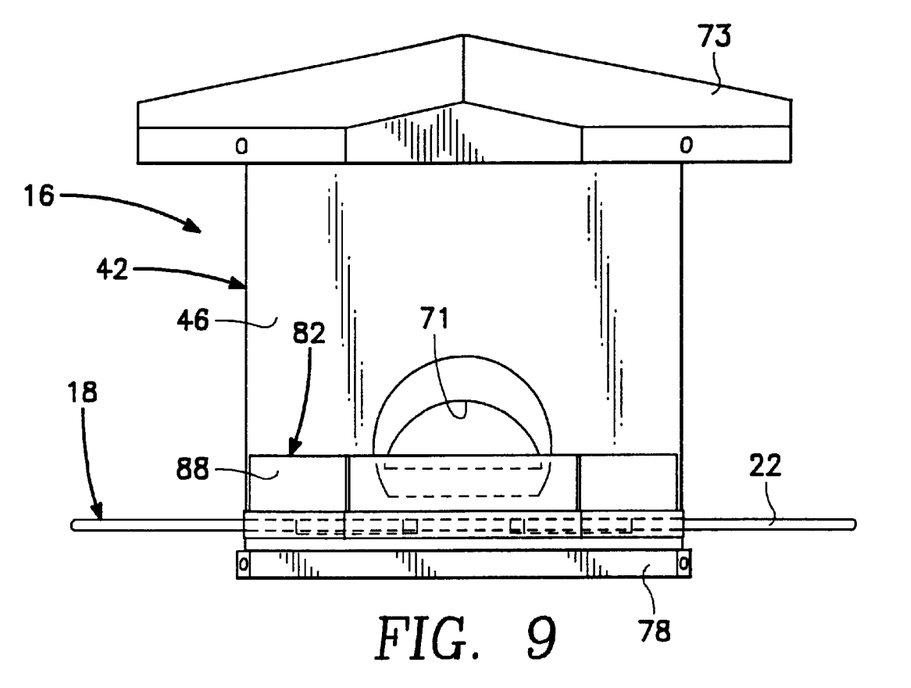
FIG. 9 is a front elevational view of the fully assembled nest module and wire form shown in FIG. 7.
Figure 10:
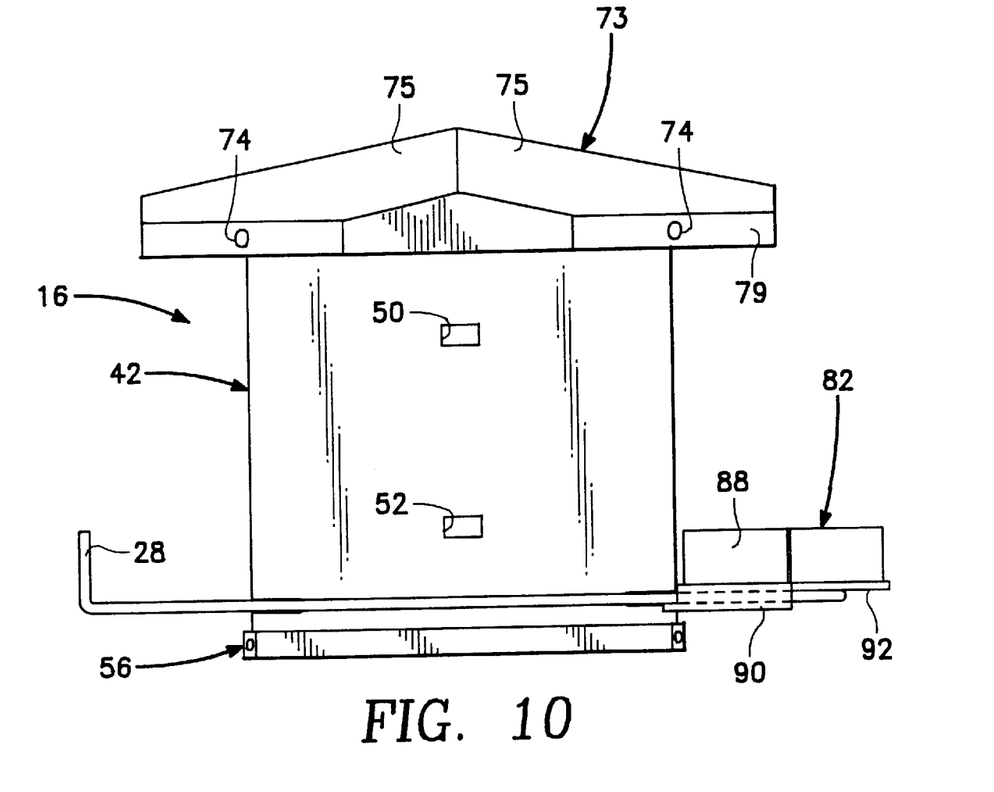
FIG. 10 is a side elevational view of the fully assembled nest module and wire form shown in FIG. 7.
Figure 11:
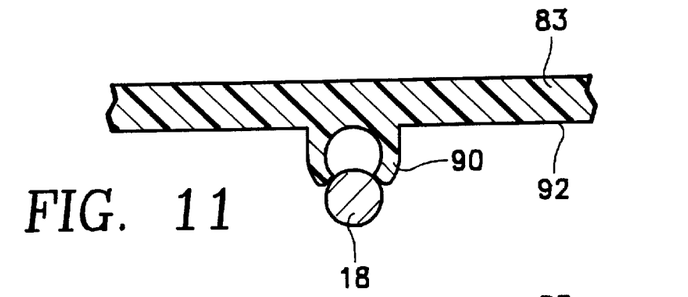
FIG. 11 is an enlarged fragmentary cross-sectional view taken along line 11—11 in FIG. 8.
Figure 12:
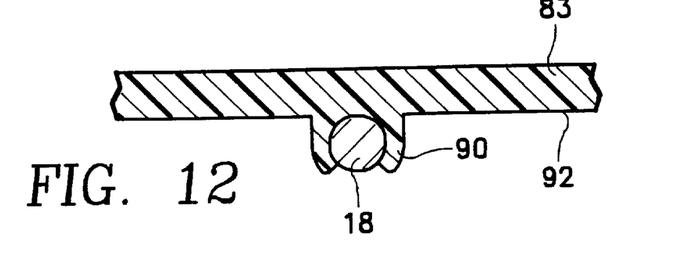
FIG. 12 is the same view as FIG. 11 showing the porch base engaged with the wire form.

Referring now primarily to FIGS. 2–5, 7 and 17, the collar and wire form of the present invention are shown in greater detail. Specifically, the wire form 18 is bent into a square shape when viewed in top plan, as best seen in FIGS. 2 and 7 (other polygonal shapes could be used). It includes four form sides 22 and four form corners 24. The free end portions of the wire form include respective parallel, spaced-apart horizontal portions 26, 26. Each horizontal portion further merges into a respective upturned end 28, 28 as shown in FIGS. 2 and 3. The up-turned ends extend about perpendicularly from the wire form plane.

For the collar, an upper flange 30 merges downwardly into a mid-section 32, with mid-section 32 further merging into lower flange 34. Extending radially outwardly and upwardly a predetermined distance from the lower flange, along the exterior of mid-section 32, are wire mount structures 35. The wire mount structures are angularly spaced-apart about the collar longitudinal axis in a manner consistent with proper separation of each wire form (and nest module 16). As best shown in FIG. 7, there are four wire mount structures spaced about 90° apart.

Extending upwardly from the bottom surface 37 of the lower flange into each wire mount structure, are a pair of spaced-apart wire apertures 36, 36. The wire apertures are sized to provide a snug engagement with corresponding upturned wire ends 28, 28.

Figure 5:
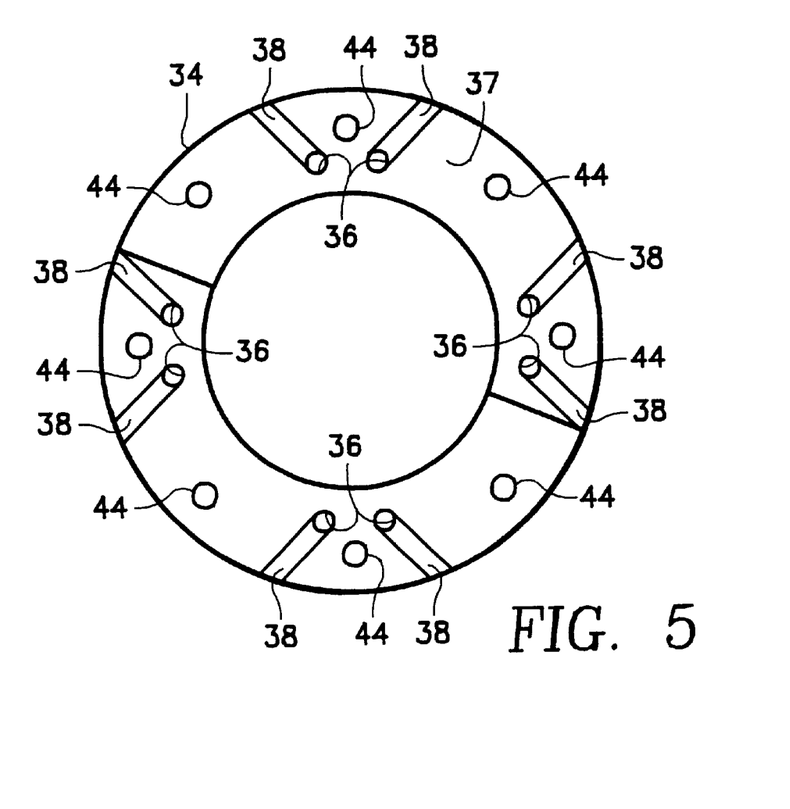
FIG. 5 is a view taken along line 5—5 in FIG. 3.

As shown in FIG. 5, wire grooves 38, 38 are formed in the bottom surface 37 of lower flange 34. The grooves extend in parallel pairs angularly outward from the corresponding opening of each pair of apertures 36, 36. They have a depth and length that is sufficient to constrain the horizontal portion 26, 26 of each wire form.

The overall collar assembly comprises a pair of mirror-image half-sleeves 29, 29 and a pair of half-flanges 40, 40. Each half-sleeve has a semi-cylindrical shape which terminates at opposing side edges with longitudinal sleeve flanges 31, 31. The longitudinal sleeve flanges each include a plurality of longitudinal flange openings 27.

For attachment of the collar to the pole, the half-sleeves are placed around the pole above the retaining flange at the desired vertical and angular positions on the pole. The half-sleeves are mated so that the inside surface 25 of each half-sleeve loosely contacts the pole and so that the longitudinal sleeve flange openings 27 are aligned. A plurality of sleeve fasteners 33 are inserted into corresponding aligned longitudinal sleeve fastener openings and a sleeve nut 23 is attached to the sleeve fastener 33 to thereby fasten the half-sleeves to each other and permit the collar 14 to slidably engage pole 12.

To fix each wire form to the collar, the upturned ends 28 are inserted into a pair of corresponding wire apertures 36 in adjacent wire structures 35 and pushed upwardly until both horizontal portions 26 seat in a respective wire groove 38. Once the upturned ends are inserted therein and the horizontal portions are seated, each half-flanges 40, 40 is placed adjacent corresponding portions of the lower flange underside. Then the half-flange openings 43 are aligned with lower flange fastener holes 44. After alignment, retaining flange fasteners 47 are inserted therethrough and retaining nuts 49 are fixed to the retaining flange fasteners for final securement. With this configuration, the wire form extends radially outward from the collar as best seen in FIGS. 2–3, 7 and 17.

Figure 17:
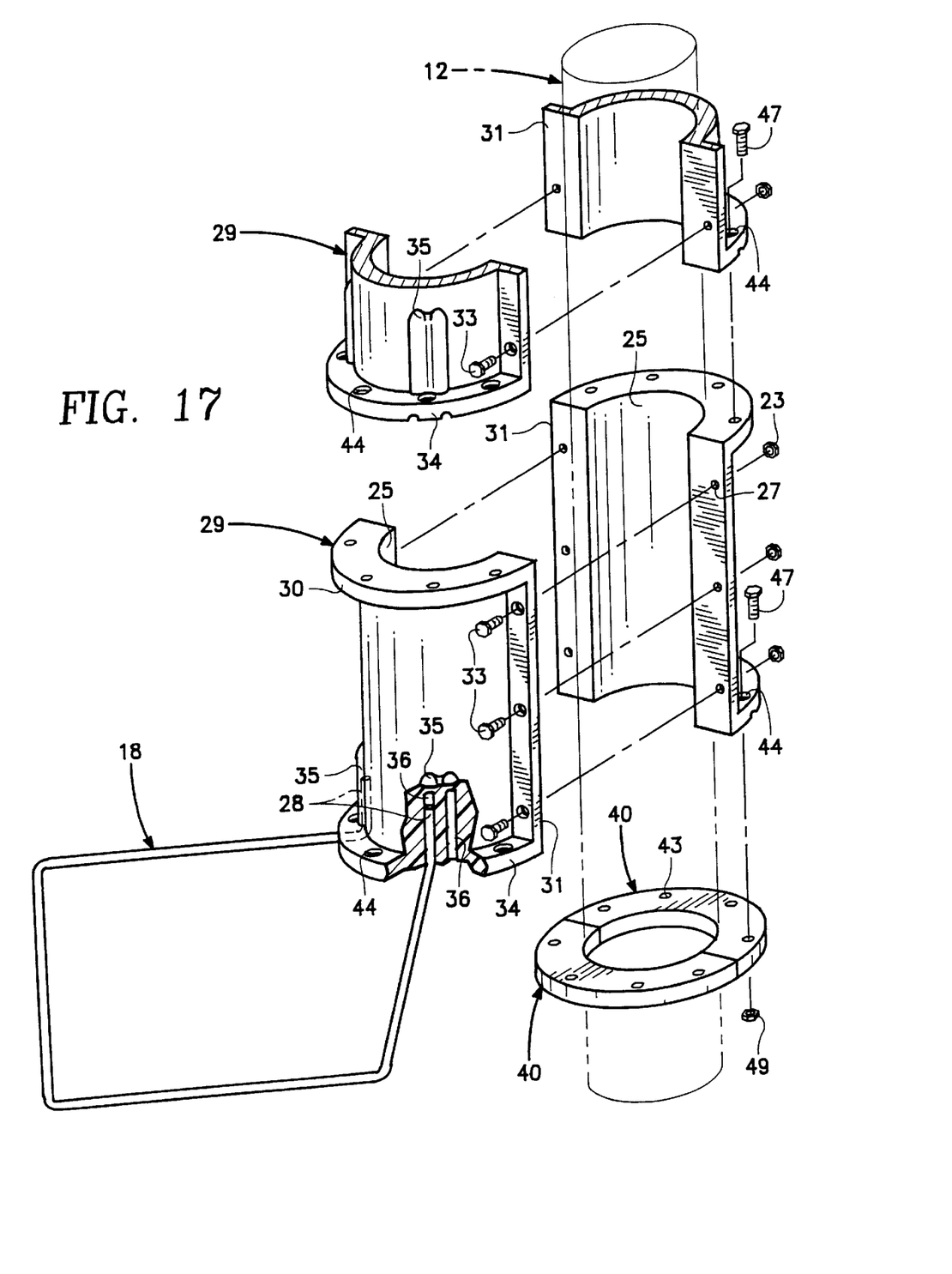
FIG. 17 is an exploded isometric view of the collar, pole and wire form of the birdhouse of FIG. 1, with portions cut away to more clearly show the manner in which the collar engages the pole and wire form.

When the collars are interconnected to create tiers of birdhouses, the structure of the collars is somewhat different. Specifically, the half-sleeves will have an inner radius that creates sufficient clearance to allow for sliding movement of the collar on the pole once the half-sleeves are fastened to each other. Further, vertically adjacent collars are aligned so that the wire mount structures are angularly offset from each other. Next, lower flange fastener openings 44 of what would be the uppermost collar are aligned with upper flange fastener openings 57 of the collar immediately below the uppermost collar, as best seen in FIG. 17. The two collars may then be fastened to each with retaining flange fasteners 47 and retaining nuts 49. With this configuration, the upper flange of one collar functions to retain the forms 18 within the wire mount structures 35 of another collar. This will occur for all collars except for the lowermost collar. Half-flanges 40,40 will still be used to retain the form 18 within the wire mount structures of the lowermost collar.

When the above configuration is used, the uppermost collar can be engaged with a winch (not shown) or similar suspending system whereby the entire birdhouse assembly is moved and positioned as a unitary structure. Alternatively, a jack or known hydraulic or pneumatic lifting/supporting means could be used to engage the lowermost collar to raise/lower the entire structure as desired by the operator.

Referring now primarily to FIGS. 6 and 18–20, the nest module 16 for the birdhouse assembly of the present invention is shown in greater detail. The nest module comprises an enclosure 42 having a vertical or center axis 55 with four walls 46, an open top and an open bottom. One wall 46 is formed with a bird entrance opening 48. The opening is large enough to allow for placement of an entrance opening insert 59.

Figure 18:
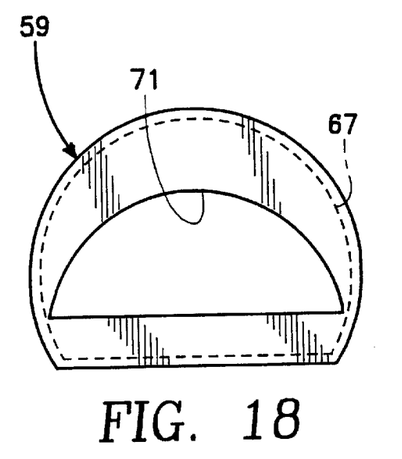
FIG. 18 is front plan view of an entrance opening insert which is placed in the bird entrance opening of the nest module of FIG. 6.
Figure 18A:
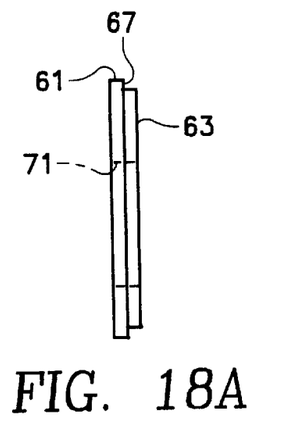
FIG. 18A is a side elevational view of the insert of FIG. 18.
Figure 18B:
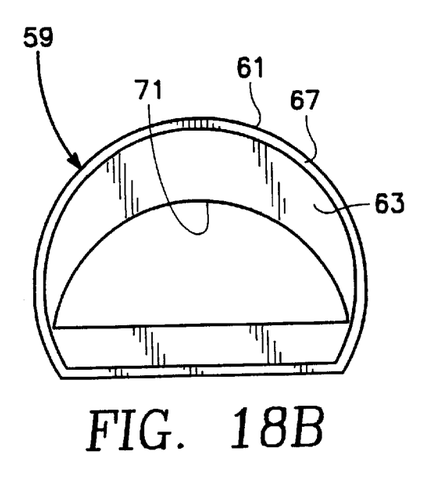
FIG. 18B is a rear plan view of the insert of FIG. 18.
Figure 19:
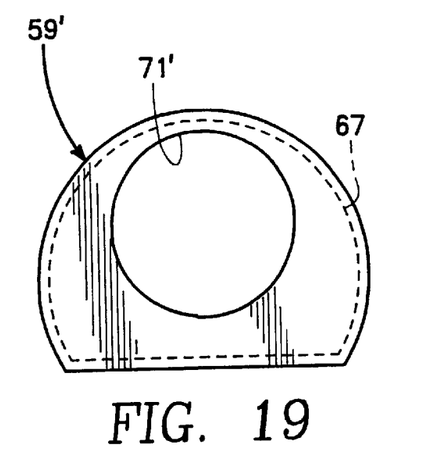
FIG. 19 is a front plan view of a first alternative embodiment of the insert of FIG. 18.
Figure 20:
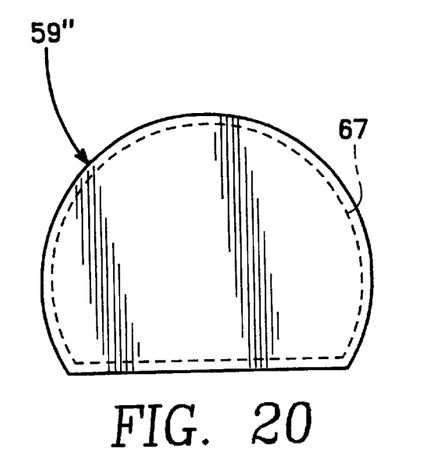
FIG. 20 is a front plan view of a second alternative embodiment of the insert of FIG. 18.

As shown in FIGS. 18–20, the entrance opening insert 59 is a somewhat plate-like structure with an insert periphery 61 having a shape that corresponds to, and is slightly larger than, the shape of the insert opening. The rear surface 63 of the entrance opening insert includes an abutment skirt 67 that extends around the insert periphery 61.

As shown in FIG. 18, the entrance opening insert can include an access opening 71 with a somewhat crescentic shape that is designed according to the species of bird to be attracted or discouraged from entering into the enclosure. Further, entrance opening insert 59' in FIG. 19 has an alternative circular access opening 71'. Entrance opening insert 59" in FIG. 20 has no opening at all (for full closure of the module during the off-season). It is to be appreciated, then, that the shape and/or geometry of the bird access openings are matters of choice according to bird size, bird preference, predator deterrence and similar types of factors.

For assembly, the entrance opening insert is press-fit into insert opening 48 until the periphery abutment engages the portions of the wall 46 immediately proximate the insert opening. It is expected that the materials of construction of the inserts and the front enclosure wall will provide a strong and effective frictional engagement. Alternatively, horizontal tabs (not shown in the Figures) that extend laterally from the insert could provide the aforementioned frictional engagement between the front enclosure wall and the insert.

Figure 6:
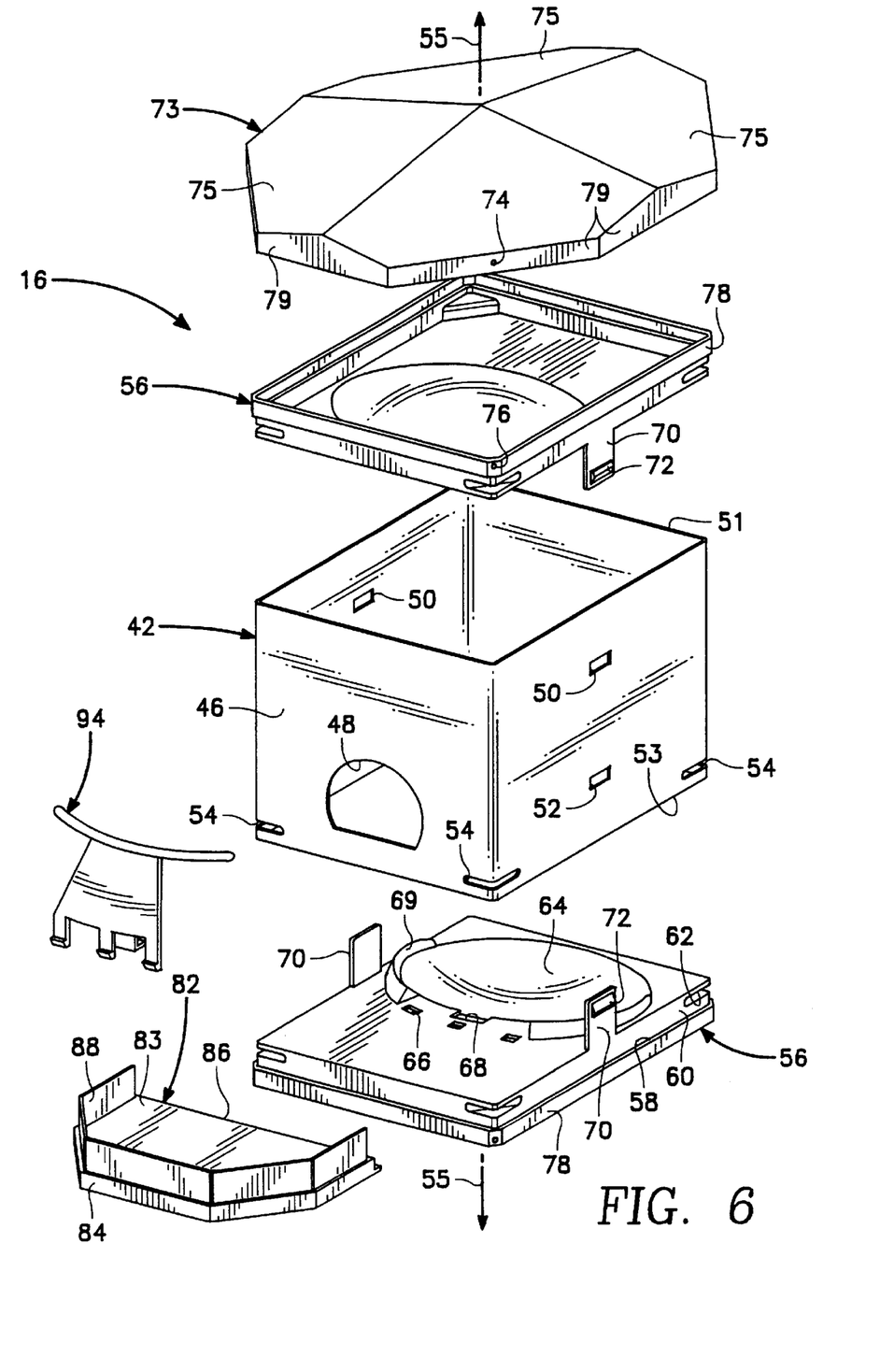
FIG. 6 is an exploded isometric veiw of a nest module for the birdhouse of FIG. 1.

Each of the opposing walls adjacent to the front wall include an upper wall slot 50 and a lower wall slot 52. Upper wall slot 50 and lower wall slot 52 are spaced proximate the wall midline about an equal distance from the respective upper edge 51 and lower edge 53 of enclosure 42. Additionally, an enclosure notch 54 is formed in each corner of the enclosure proximate lower edge 53, for reasons to be described below.

Referring again primarily to FIG. 6, it can be seen that the nest module includes a pair of spaced-apart horizontal members 56, 56 that have identical structures. They can function (when attached to enclosure 42) as a roof or a ceiling for the nest module. Each horizontal member 56 includes a lip 58 which separates an inset portion 60 from outer portion 78. Lip 58, inset portion 60 and outer portion 78 all extend completely around the perimeter of the horizontal member. A member notch 62 is formed in the inset portion at each corner of the horizontal member.

Each horizontal member further includes an ovate nesting cavity 64 to facilitate the nesting of birds in nest module 16. A plurality of guard slots 66 are formed in the horizontal member proximate the forward outer edge of nesting cavity 64. A support slot 68 is further formed in the horizontal member and is located between guard slots 66 and the outer edge of nesting cavity 64. A pair of spaced-apart mud ridges 69 extend upwardly from opposing ends of the nesting cavity 64.

To facilitate assembly of the nest module, the horizontal member also includes a pair of opposing tabs 70 that extend upwardly from the inset portion 60. Both tabs incorporate a beveled ridge 72 that extends outwardly from tab 70.

To connect the horizontal member to enclosure (module floor) 42, the enclosure is urged toward horizontal member 56 until lower edge 53 of enclosure engages lip 58. Before the lower edge contacts lip 58, however, the lower edge will engage beveled ridge 72. When this occurs, tabs 70 flex inwardly to allow for continued movement of enclosure 42 toward lip 58. When lower 53 contacts lip 58, ridge portions 72 engage the wall lower slots 52 on enclosure 42 to thereby fix the horizontal member (module floor) to enclosure 42.

Since the module floor and the module ceiling are interchangeable with each other (because horizontal members 56, 56 have the same structure), the procedure for attaching the module ceiling to enclosure 42 is the same as described above. More specifically, to attach the module ceiling to the enclosure, the process described above is repeated until upper edge 51 engages lip 58 and beveled ridge 72 engages the wall upper slot 50

Each nest module is provided with a discrete roof 73. As best shown in FIG. 6, the roof comprises four flat polygonal panels 75 that incline downwardly from a peak 77 to a segmented peripheral roof skirt 79. Skirt fastener openings 74 are provided at each point where a skirt segment contacts a ceiling horizontal member. A corresponding corner fastener opening 76 is provided in the horizontal member. When the fastener openings are aligned during assembly, fasteners (not shown) are inserted through the openings to secure the roof to the ceiling horizontal member.

Figure 16:
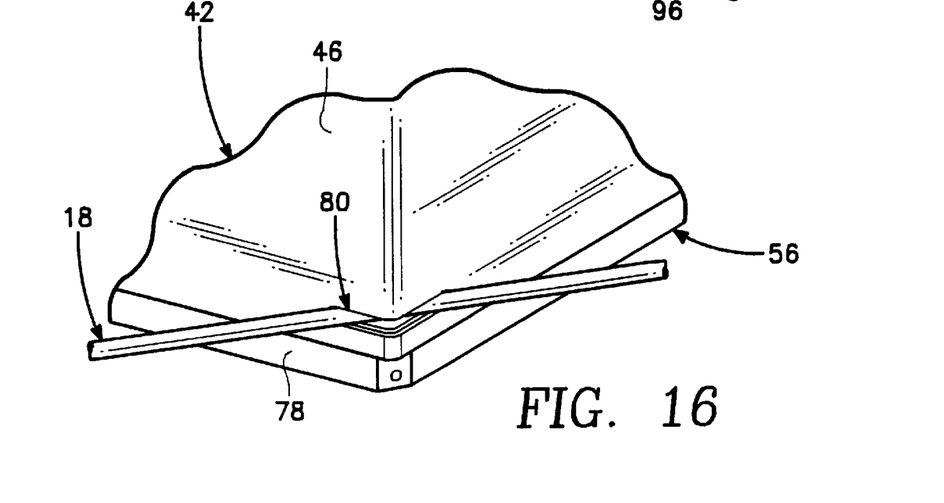
FIG. 16 is an enlarged isometric view of the corner portion of the nest module shown in FIG. 6.

Once the horizontal member 65 that functions as the module floor is attached to enclosure 42 as described above, each enclosure notch 54 aligns with a respective member notch 62. Once aligned, the enclosure notches and member notches cooperate to define a plurality of connector slots 80 for the nest module, as best seen in FIG. 16. The connector slots 80 facilitate the manner in which each nest module is detachably fixed to a respective wire form.

To more fully appreciate the manner in which the nest module 16 is detachably fixed to wire form 18, and referring primarily to FIGS. 7 and 16, the nest module is initially positioned within wire form 18. Once positioned therein, the nest module is rotated one quarter turn clockwise or counterclockwise about center axis 55. During rotation, each connector slot on the nest module becomes engaged with a respective form side of the wire form to thereby fix the nest module to the wire form without the use of tools and/or implements.

Referring now primarily to FIGS. 6–12, each nest module further includes a respective porch 82. The porch provides a securement means for fixing the nest module to the wire form as described below. The porch comprises a porch base 83 defined by an inner straight end 86 and an outer segmented end 84. Corresponding porch wall segments 88 extend upwardly from the outer end.

In this embodiment, and as best seen in FIGS. 8–12, two pairs of flexible arms 90 extend from underside 92 of the porch base 83. The arms coact to snap-over select portions of wire form 18. In particular, the porch is positioned so that inner end 86 abuts the front wall of enclosure 42. The porch is then urged downwardly onto the wire form. When this occurs, the flexible arms yield outwardly until the porch is in place. At that point, the arms flex back to their unbiased position with a firm hold on the form side of the wire form. It is to be appreciated, however, that other means know in the art such as tabs, retainers, detents, springs, clips and the like may be used to fix the porch to the wire form.

When the porch is attached to the wire form as discussed above, the elongated abutment area between porch inner end 86 and the enclosure front wall prevents any contra-rotation of the nest module with respect to the wire form. Therefore, installation of the porch on the wire form functions to prevent slippage of the nest module and/or any inadvertent disengagement of the connector slots from the wire form sides.

Although the porch as shown in the Figures is attached to the form corner furthest from the collar and pole, it is to be appreciated the porch could be assembled on any form corner and still abut an enclosure wall to prevent slippage of the nest module with respect to the wire form.

Figure 14:
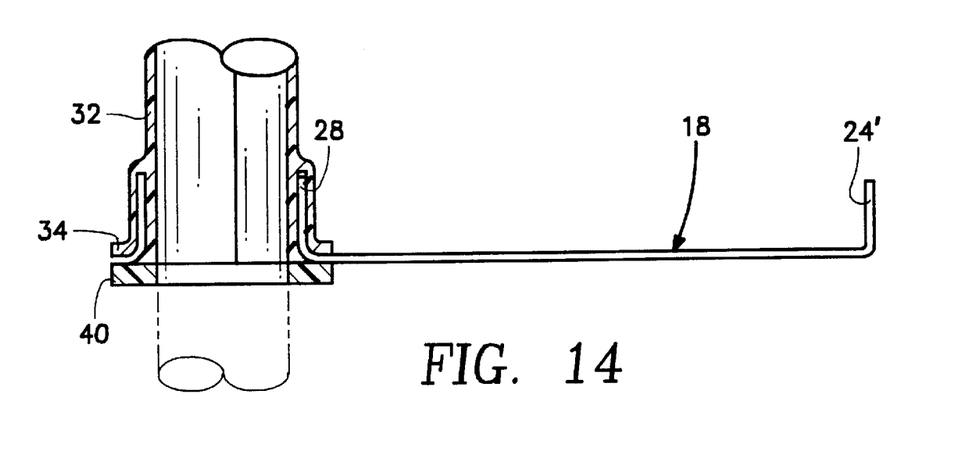
FIG. 14 is fragmentary cross-sectional view similar to FIG. 3 showing an alternative embodiment of the wire form for the birdhouse of FIG. 1.

In an alternative embodiment of the invention, and referring now to FIG. 14, the wire form can be modified to provide an outside perch area in addition to a dedicated porch. Specifically, the form corner 24' that is furthest from collar 14 can be bent upwardly and be flattened to function primarily as an external predator deterrent for the nest module, and secondarily as an additional external perch.

Figure 13:
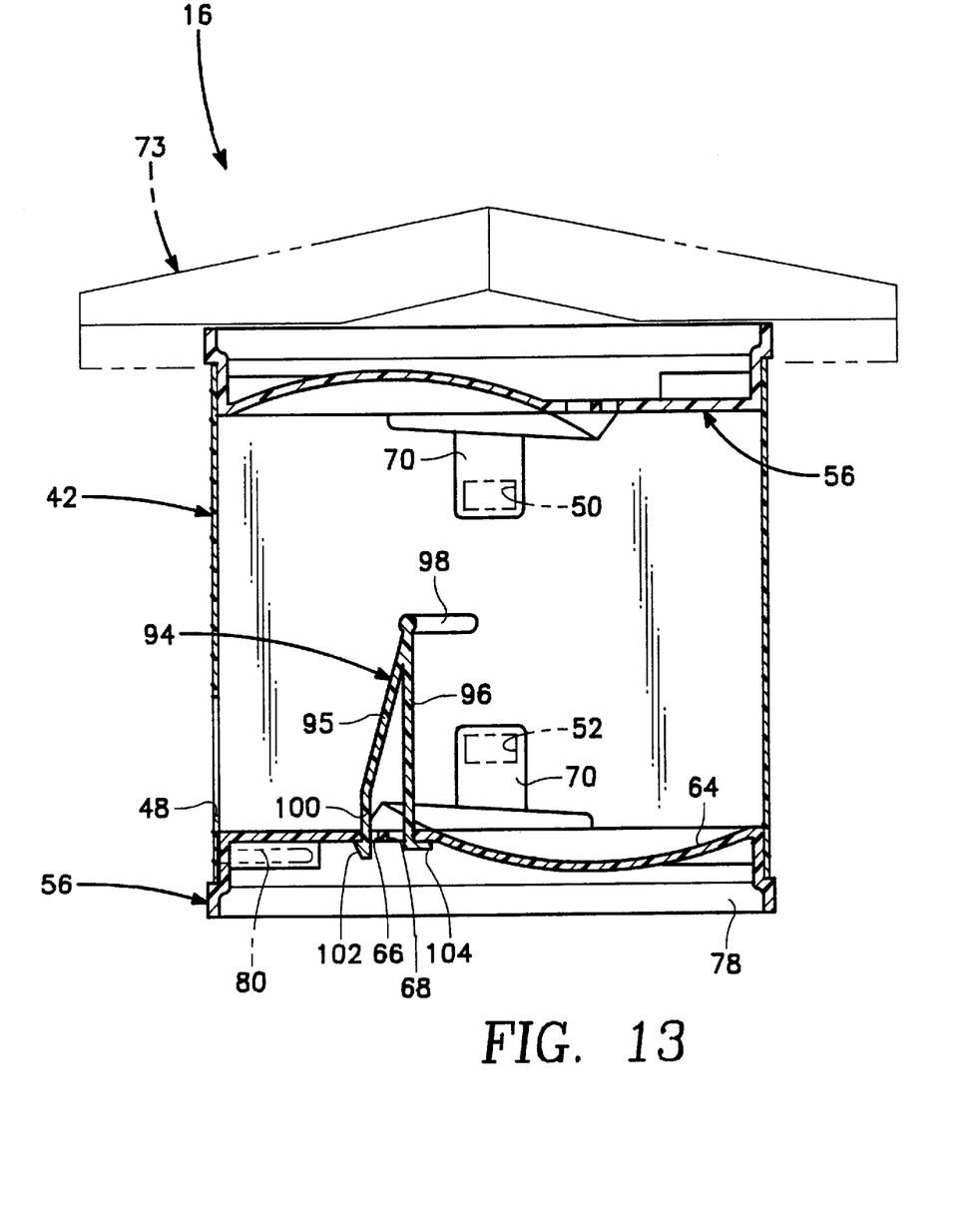
FIG. 13 is a cross-sectional view taken along line 13—13 in FIG. 7.
Figure 15:
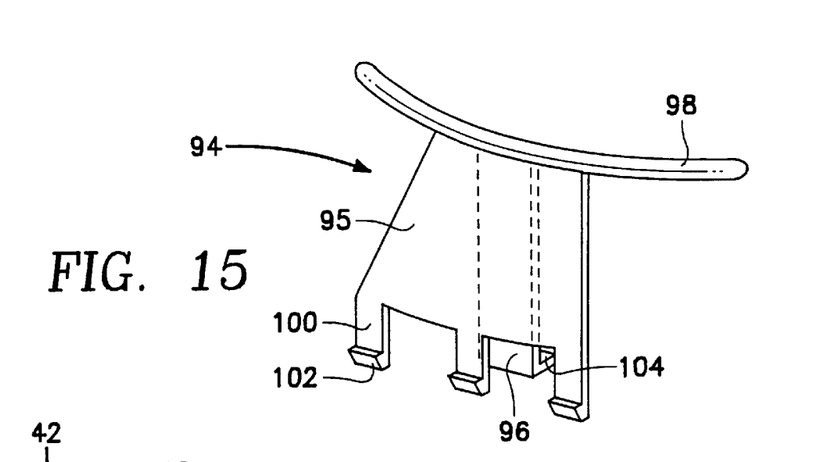
FIG. 15 is an enlarged isometric view of the predator guard shown in FIG. 6.

Referring now to FIGS. 6, 13 and 15, the birdhouse of the present invention may include a predator guard 94. The predator guard includes an arcuate outer wall 95 and an inner brace 96 (the inner brace is partially shown in phantom in FIG. 15). Both structures extend upwardly and merge into an arch-shaped perch bar 98. The perch bar extends transversely beyond the side edges of the arcuate outer wall to provide a perch area inside the enclosure 42. A plurality of guard tabs 100 extend downwardly from the arcuate outer wall 95. The lower end of each tab has a beveled guard extension 102. A horizontal leg portion 104 extends about perpendicularly inward from the lower edge of the inner brace 96.

For installation, the horizontal leg portion 104 is inserted into brace slot 68 on the floor horizontal member 65. Next, the predator guard is pivoted outwardly about horizontal leg portion 104 until each beveled guard extension 102 contacts a respective guard slot 66. The predator guard is further pivoted in the same direction, which causes the guard tabs 100 to yield until the beveled guard extensions 102 pass through the guard slots. When this occurs, the guard tabs regain their original position and engage the guard slots to fix the predator guard to the floor horizontal member 65.

For the manufacture of the present invention, the nest module parts are preferably made of a plastic material and injection molded in a manner known in the art. Other materials however, such as wood, resin composites or laminates, ceramics, and lightweight metal alloys are envisioned as materials of construction. The wire form is preferably made of a corrosion-resistant metal alloy having sufficient strength for supporting the weight of the birdhouse, yet having sufficient flexibility to facilitate assembly of the birdhouse as described above. The support pole and collar are also preferably made of a non-corrosive metal alloy material.

While the particular modular birdhouse, as herein shown and disclosed in detail, is fully capable of obtaining the objects and providing the advantages above stated, it is to be understood that the presently preferred embodiments are merely illustrative of the invention. As such, no limitations are intended other than as defined in the appended claims.

What is claimed is:

1. A bird nest module comprising:
    an enclosure having a periphery defined by sidewalls connected to a floor horizontal member and a ceiling horizontal member;
    said enclosure having a center axis and a plurality of connector slots spaced angularly apart about said periphery; and,
    a wire form positioned outside said enclosure having an outline that corresponds to said periphery, said wire form including form sides that engage said connector slots when said enclosure is rotated about said center axis.

2. The module of claim 1 wherein said periphery has a polygonal shape with sidewall corners, said connector slots extending across said sidewall corners.

3. The module of claim 1 wherein the longitudinal axes of said connector slots define a slot plane and said wire form outline defines a wire plane.

4. The module of claim 3 wherein said sidewalls include a front sidewall having a bird access opening; and,
    said floor horizontal member having a nesting cavity in said enclosure which is located a predetermined distance from said access opening.

5. The module of claim 4 including a predator guard extending upwardly from said floor horizontal member between said access opening and said nesting cavity.

6. The module of claim 1 wherein one of said sidewalls is a front wall having a bird access opening and further comprising;
   a porch extending outwardly from said access opening, said porch being connected to said wire form and being in contact with said front wall whereby rotation of said enclosure about said center axis is prevented.

7. A birdhouse assembly comprising:
   an upstanding support pole;
   a collar locatable at selected vertical positions on said pole;
   at least one flexible wire form engaged with said collar and extending radially outward from said pole; and,
   at least one nest module having a plurality of connector slots, said wire form engaging said connector slots to support said nest module.

8. The assembly of claim 7 wherein said collar includes a plurality of form openings, said wire form including a first upturned end and a second upturned end, said first upturned end and said second upturned end being inserted into a corresponding form opening.

9. The assembly of claim 8 wherein said wire form has a polygonal shape coincident with a first plane, and wherein said first upturned end and said second upturned end extend in about the same direction and are about coincident with a second plane perpendicular to said first plane.

10. The assembly of claim 7 wherein said wire form has a selected number of form corners and form sides that corresponds to the number of connector slots.

11. The assembly of claim 10 wherein each of said connector slots engages a respective form side.

12. The assembly of claim 10 wherein one of said form corners comprises a porch corner, said birdhouse including a porch overlying said porch corner.

13. The assembly of claim 12 wherein said porch has an inner end that abuts against said nest module to inhibit disengagement of said nest module from said wire form.

14. The assembly of claim 7 wherein said nest module comprises:
   an enclosure having an open top, an open bottom and four walls, one of said walls having an access opening;
   a module floor attached to said enclosure to enclose said open bottom; and,
   a module ceiling having the same structure as said module floor and being interchangeable therewith, said module ceiling attached to said enclosure to enclose said open top.

15. The assembly of claim 14 further comprising:
   at least one predator guard corresponding to each respective nest module, said predator guard extending upwardly from said module floor.

16. The assembly of claim 14 further comprising:
   at least one roof corresponding to each respective nest module and being attached to said module ceiling.

17. A wildlife habitat device comprising:
   a pole;
   a collar locatable at selected vertical positions on said pole, said collar including a plurality of form openings, said connecting means comprising a wire form having upturned ends inserted into respective form openings to attach said wire form to said collar, said nest modules being detachably connected to said wire form;
   a plurality of nest modules extending radially outward from said pole;
   each of said nest modules comprising an enclosure having four walls, an open bottom and an open top, and further comprising an upper horizontal member and a lower horizontal member each having about identical structure and connected to said enclosure to respectively cover said open top and said open bottom; and,
   a means for detachably connecting each of said nest modules to said collar.

18. The device of claim 17 wherein said wire form has a polygonal shape coincident with a first plane, and further wherein said upturned ends extend in about the same direction and are coincident with a second plane which is about perpendicular to said first plane.

19. The device of claim 18 wherein said polygonal shape includes four form corners and four form sides.

20. The device of claim 19 wherein each nest module has a plurality of connector slots and said connector slots are engaged to said form sides.

21. The device of claim 19 wherein each nest module has a porch selectively attached to one of said form corners, said porch having spaced-apart longitudinal arms engaged with said wire form.

22. The device of claim 19 wherein each respective nest module has a predator guard that extends upwardly from said lower horizontal member.

23. The device of claim 17 wherein each nest module has a roof which is attached to said upper horizontal member.

24. A method for providing a nesting area for birds comprising the steps of:
   A) providing an upstanding support pole;
   B) positioning a collar at a selected vertical position on said pole;
   C) attaching a plurality of flexible wire forms to said collar so that said wire forms extend radially outward from said pole;
   D) providing a nest module for each respective wire form;
   E) placing a plurality of connector slots in said nest module; and,
   F) engaging said connector slots with said wire form to support said nest module.

25. The method of claim 24 wherein each wire form has a polygonal shape that includes form corners and form sides; wherein said step F) comprises the engagement of said connector slots with said form sides.

26. The method of claim 25 wherein said nest module has a vertical axis and each wire form defines an inner area having a center axis, step F) further comprising the steps of:
   F-1) placing said nest module within said defined area so that said vertical axis is co-extensive with said center axis and said connector slots are in the same plane as said wire form; and,
   F-2) rotating said nest module until said connector slots become engaged with said wire form.

27. The method of claim 28 including the step of:
   G) attaching a porch to one of said form corners so that said porch abuts said nest module to inhibit disengagement of said connector slots from said form sides.

* * * * *